United States Patent
Sotir et al.

(10) Patent No.: US 10,112,674 B2
(45) Date of Patent: Oct. 30, 2018

(54) FOLDING SYSTEM FOR BICYCLE STEERING TUBE

(71) Applicant: GM Global Technology Operations LLC, Detroit, MI (US)

(72) Inventors: Radu D. Sotir, Toronto (CA); George C. Floarea, Whitby (CA); Hung H. Nguyen, Toronto (CA); Christopher G. Gibson, Courtice (CA)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/425,173

(22) Filed: Feb. 6, 2017

(65) Prior Publication Data
US 2017/0327178 A1    Nov. 16, 2017

Related U.S. Application Data

(60) Provisional application No. 62/335,210, filed on May 12, 2016.

(51) Int. Cl.
*B62K 15/00* (2006.01)
*B62J 6/18* (2006.01)
*B62K 23/06* (2006.01)
*B62J 99/00* (2009.01)

(52) U.S. Cl.
CPC ............... *B62K 15/008* (2013.01); *B62J 6/18* (2013.01); *B62J 2099/0046* (2013.01); *B62K 23/06* (2013.01); *Y10T 16/528* (2015.01)

(58) Field of Classification Search
CPC ... B62K 15/006; B62K 15/008; Y10T 16/528; Y10T 16/5285
See application file for complete search history.

(56) References Cited

U.S. PATENT DOCUMENTS

| | | | | |
|---|---|---|---|---|
| 2,394,494 A | * | 2/1946 | Schwinn | B62K 15/006 280/178 |
| 5,440,948 A | * | 8/1995 | Cheng | B62K 15/006 280/278 |
| 6,293,575 B1 | * | 9/2001 | Burrows | B62K 15/006 280/278 |
| 7,762,570 B2 | * | 7/2010 | Mihelič | B62K 15/006 280/276 |
| 8,430,414 B1 | * | 4/2013 | Yap | B62K 15/008 280/278 |
| 8,882,124 B2 | * | 11/2014 | Yap | B62K 15/006 280/278 |
| 9,533,730 B2 | * | 1/2017 | Yu | B62K 19/18 |
| 9,752,364 B2 | * | 9/2017 | James | E05D 11/1014 |

FOREIGN PATENT DOCUMENTS

DE   102010031822 A1 * 1/2012 ........... B62K 15/006

* cited by examiner

*Primary Examiner* — Kevin Hurley
(74) *Attorney, Agent, or Firm* — Lorenz & Kopf, LLP

(57) ABSTRACT

A product may include a steering tube that may have a first component, and a second component. A hinge may be connected to enable the first and second components to fold relative to one another so that the steering tube is foldable. A latch may secure the first and second components in an unfolded position. The first and second components may be locked in a folded position. The latch may include a lever that has a latch hook. The first and second components may be secured through engagement of the latch hook with a striker.

18 Claims, 4 Drawing Sheets

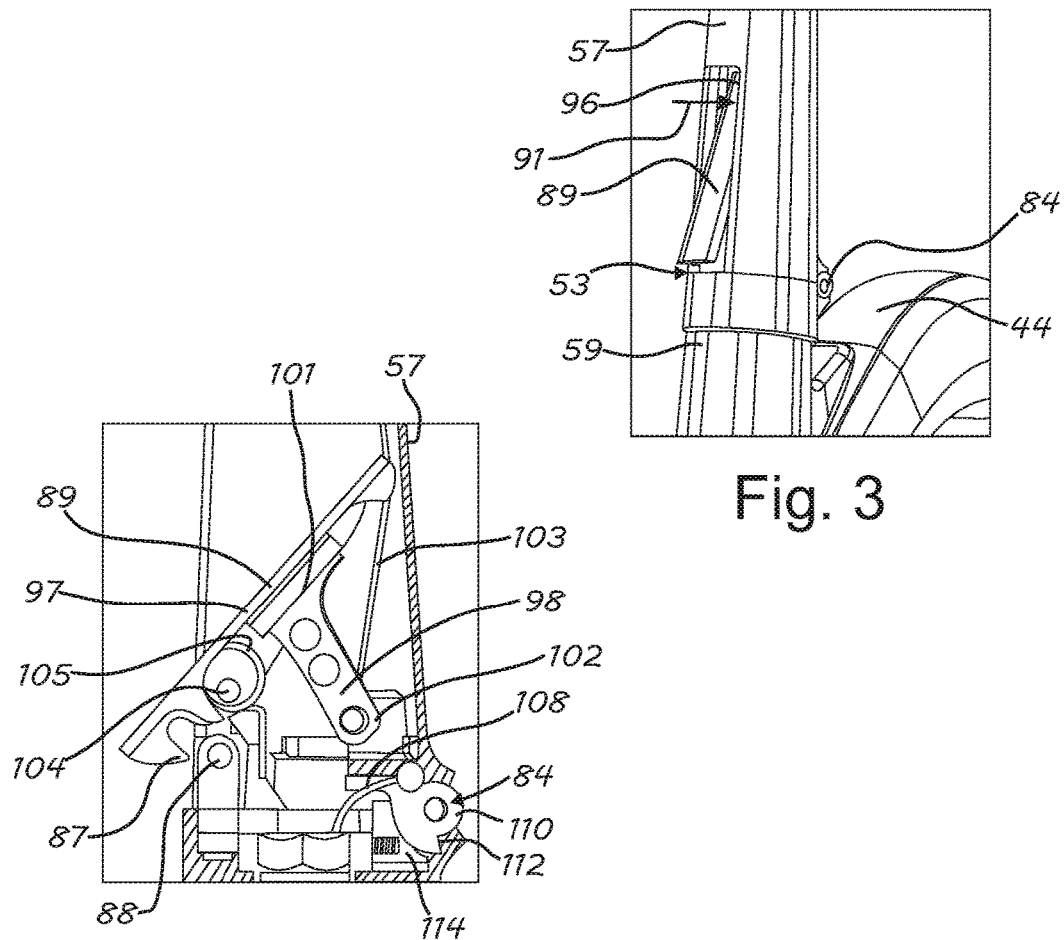
Fig. 3
Fig. 4
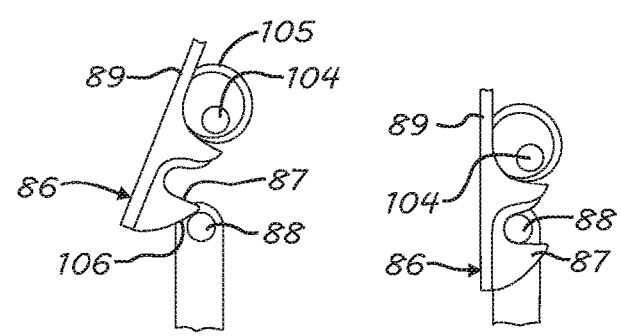
Fig. 5　　　Fig. 6

FOLDING SYSTEM FOR BICYCLE STEERING TUBE

CROSS-REFERENCE TO RELATED APPLICATIONS

This application claims the benefit of U.S. Provisional Application No. 62/335,210 filed May 12, 2016.

TECHNICAL FIELD

The field to which the disclosure generally relates includes cycles, and more particularly, includes cycles with folding features.

BACKGROUND

Cycles may come in a variety of forms that may be propelled through manual power, machine power, or both. Reconfiguring a cycle to a compact form may be desirable for storage or transportation. The mechanisms that enable reconfiguration, tend to be complex, and operation of the mechanisms may be time consuming. As a result, new approaches to enable reconfiguration are needed.

SUMMARY OF ILLUSTRATIVE VARIATIONS

A number of illustrative variations may involve a product that may include a steering tube that may have a first component, and a second component. A hinge may be connected to enable the first and second components to fold relative to one another so that the steering tube is foldable. A latch may secure the first and second components in an unfolded position. The latch may include a lever that may have a latch hook. The product may include a striker. The first and second components may be secured through engagement of the latch hook with the striker.

A number of additional variations may involve a product that may include a frame. A steering tube may be connected to the frame. A wheel may be connected with the steering tube. The steering tube and the wheel may be rotatable relative to the frame. A hinge may be connected to enable folding the steering tube relative to the frame between a folded position and an unfolded position. The folded position may be closer to the frame than the unfolded position. A latch may secure the steering tube in the unfolded position. The latch may include a lever that has a latch hook. The product may include a striker. The steering tube may be secured in the unfolded position through engagement of the latch hook with the striker.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 3 illustrates aspects of the steering tube folding system of FIG. 2 in a snapshot fragmentary view according to a number of variations.

FIG. 4 illustrates aspects of the steering tube folding system of FIG. 2 in a snapshot fragmentary view according to a number of variations.

FIG. 5 illustrates a detail of the steering tube folding system of FIG. 4 according to a number of variations.

FIG. 6 illustrates a detail of the steering tube folding system of FIG. 4 according to a number of variations.

DETAILED DESCRIPTION OF ILLUSTRATIVE VARIATIONS

The following description of the variations is merely illustrative in nature and is in no way intended to limit the scope of the invention, its application, or uses.

Figure 1:
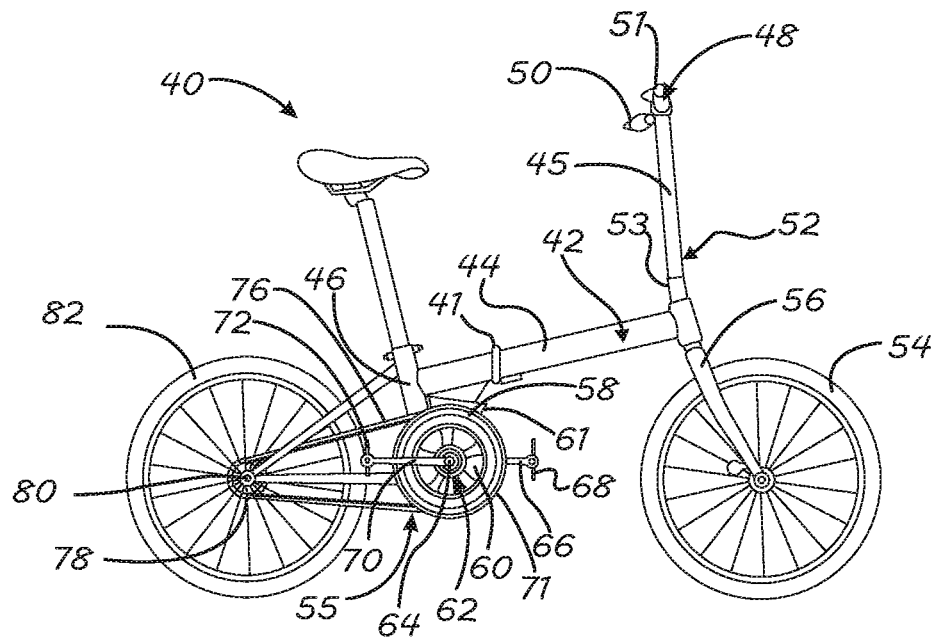
FIG. 1 illustrates a cycle according to a number of variations.

FIG. 1 illustrates a number of variations which may include a cycle 40. In any of a number of variations, the cycle 40 may include a frame 42 which may include a main tube 44 connected to a seat tube 46. The main tube 44 may include a hinged joint 41 to enable folding the frame 42, so that the cycle 40 may be more easily transported and stored. A latch release 43 may unlatch the joint 41. Additional joints may be included to facilitate folding of the frame 42 into a reduced package size for storage or transport. A steering tube 45 may extend from the main tube 44. The steering tube 45 may be operatively connected to a front fork 56 which may be attached to a front wheel 54. A handlebar assembly 48 may be attached to the steering tube 45 and may be used to control the direction of the front wheel 54 by way of the front fork 56. The handlebar assembly 48 may include a pair of opposed handles, and may include a joint 51 to enable folding of the handlebar assembly 48. Control mechanisms 50 may be provided on the cycle 40, such as on the handlebars assembly 48, the steering tube 45 as shown, or on other parts of the frame 42. The control mechanisms 50 may be constructed and arranged to communicate with one or more input receiving or control devices of the cycle 40. The one or more input receiving or control devices may include, latches, release mechanisms, other mechanical devices, or other mechanisms that may include electronic devices such as to receive input signals and/or communicate data. The one or more input receiving or control devices may effect functions or operations in response to inputs from the control mechanisms, and/or may further communicate with various components of the cycle 40. In a number of variations, the control mechanisms 50 may be located on other parts of the frame 42, in combination with, or as an alternative to, the steering tube 45 or the handlebar assembly 48. The control mechanisms 50 may be levers, knobs, other human interface devices, or other mechanisms that may be manually manipulated. The single or plural control mechanisms 50 may communicate with controlled devices in a number of ways such as through mechanical links, electrical conductors, or wireless connections. The steering tube 45 may be foldable, which may be effected separately, or in coordination with folding of the frame 42 at the joint 41, and/or the handlebar assembly 48 at the joint 51, to place the cycle 40 in a compact package for convenient storage or transportation. The folding system 52 may include one or more joints 53 to fold components of the cycle 40. The joint 53 may connect an upper component 57 of the steering tube 45 with a lower component 59 of the steering tube 45 as shown in FIG. 2, or directly with the frame 42, such as at main tube 44.

In a number of variations the cycle 40 may include a propulsion system 55 that may operate on manual inputs, motor powered inputs, or a combination thereof. The propulsion system 55 may include a crank assembly 62 which may include a crankshaft 64 that may be connected with a first pedal assembly 66 and a second pedal assembly 70. The first pedal assembly 66 may include a first foot pedal 68, and the second pedal assembly 70 may include a second foot pedal 72. A linked element 71, which may be a sprocket or a pulley or another device for linking with a drive wheel 82, may be operatively connected to the crankshaft 64 for driving a linking member 76. The linking member 76 may be a chain or belt or another link suitable for engaging the linked element 71 and may be operatively connected to a rear linked element 78 which may be operatively connected to a hub 80 of the drive wheel 82. The drive wheel 82 may be a road wheel in-that it contacts the surface upon which the cycle 40 operates. The linked element 78 may be a sprocket or pulley or another device suitable for engaging with the linking member 76. The cycle 40 may be a bicycle, tricycle, or four-wheel cycle having the crank assembly 62 constructed and arranged to allow a rider to provide input thereto using the first pedal assembly 66 and the second pedal assembly 70, and may include a motor powered unit that may be packaged in the propulsion system 55.

Figure 2:
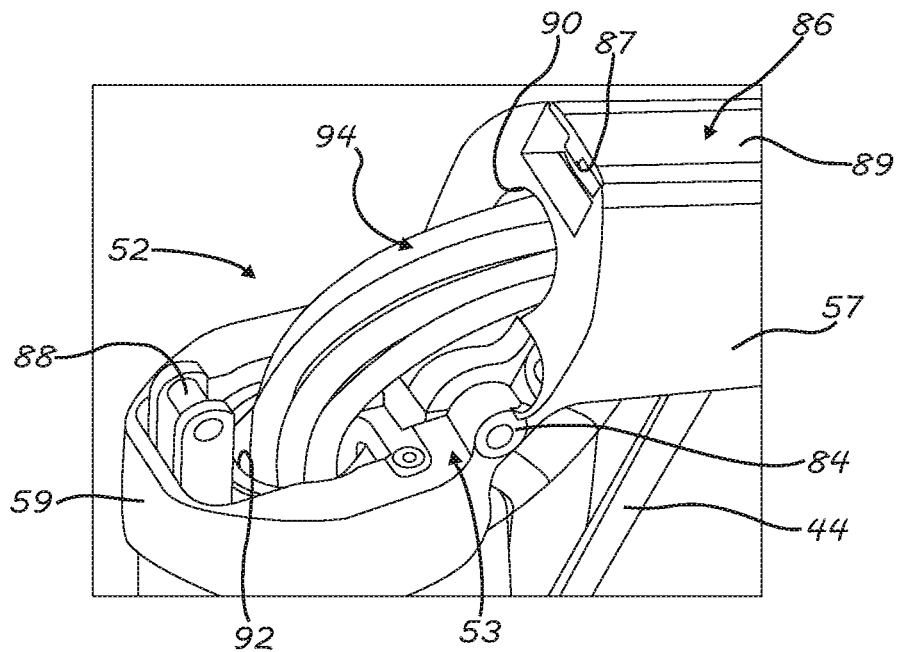
FIG. 2 illustrates aspects of a steering tube folding system for the cycle of FIG. 1 in a snapshot fragmentary view according to a number of variations.

With reference to FIG. 2, the folding system 52 may provide fast, easy, folding and unfolding of the cycle 40. The folding system 52 may include self-locking operation in the folded position of FIG. 2 and/or in the unfolded position of FIG. 1. The joint 53 may be actuated in coordination with remote control (lock/unlock), of other joints in the cycle 40, such as the joints 41, 51. The joint 53 may include a hinge 84 connecting the upper component 57 with the lower component 59. The hinge 84 may enable folding the upper component 57 relative to the lower component 59, such as over or alongside the main tube 44. The folding system 52 may include a latch system 86 for holding the upper component 57 in the unfolded position of FIG. 1. The latch system 86 may be a push-type system where it may be released through the application of a push force 91, as indicated in FIG. 3. The latch system 86 may include a latch hook 87 that may interact with a striker 88. The latch hook 87 may be carried on a release lever 89. It will be understood that the latch hook 87 and the striker 88 may be located in reversed positions on the upper and lower components 57, 59. The latch hook 87 and striker 88 may be contained within the steering tube 45 and may be concealed therein when the joint 53 is in the unfolded and latched position of FIG. 1. The upper and lower components 57, 59 may include openings 90, 92, respectively that may contain a cable bundle 94, which may be concealed in the steering tube 45 when the joint 53 is in the unfolded and latched position of FIG. 1. The cable bundle 94 may pass through the joint 53 and may flex when the joint 53 is in the folded position of FIG. 2. With reference to FIG. 3, when the upper component 57 is in the unfolded and latched position, the joint 53 may be unlatched by pivoting the lever 89 to release the latch hook 87 from the striker 88. This may be done directly via the push force 91 on an upper portion 96 of the lever 89, or remotely though a cable or other device. The remote release may be effected individually for the joint 53 or may be done in combination with other joints, such as the joints 41 and/or 51, to fold the cycle 40.

In a number of variations as shown in FIG. 4, the lever 89 may include a body 97 that may match the outer contour of the upper component 57, and may include an arm 98 that may extend into the upper component 57. The arm 98 may have an end 101 proximate the body 97 and an end 102 distant from the body 97. A cable 103 may be connected to the distal end 102. The lever 89 may rotate about a pivot 104 on the upper component 57. A spring 105 may bias the lever 89 to the latched position. The cable 103 may be connected to the joint 51 of the handlebar assembly 48, and may provide a pulling force when the lever 89 is rotated for use in folding of the handlebars assembly 48. In a number of variations as shown in FIGS. 5 and 6, the latch system 86 may include a self-latching feature when the steering tube 45 is unfolded. When the upper portion 57 is unfolded, the latch hook 87 may include a curved outer profile 106 that may operate as a cam. When the profile 106 contacts the striker 88, the lever 89 may rotate as shown in FIG. 5 so that the latch hook 87 may pass the striker 88. When the upper component 57 is fully unfolded, the spring 105 may move the lever 89 to capture the striker 88 with the latch hook 87 as shown in FIG. 6, locking the steering tube 45 in the unfolded position.

Figure 7:
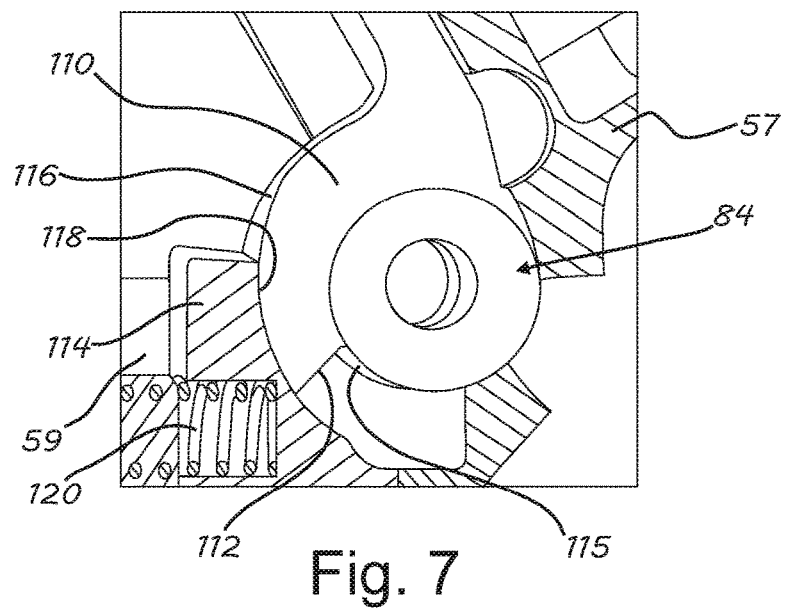
FIG. 7 illustrates a detail of the steering tube folding system of FIG. 4 according to a number of variations.

With reference again to FIG. 4, in a number of variations the folding system 52 may include a cable 108 that may be connected to the upper component 57 that may be used for remote control action for folding the frame 42 as the steering tube 45 is folded. For example, folding of the upper portion 57 relative to the lower portion 59 on the hinge 84 may pull the cable 108 applying a force to unlatch the latch 41 for use in folding the frame 42. The area of the hinge 84 may include a barrel 110 that may rotate with the upper component 57 to which the cable 108 may be attached. The barrel 110 may form a part of the hinge or may be a separate component. The barrel 110 may include a step surface 112 that may provide a receptacle that may operate in conjunction with a lock block 114 to lock the steering tube 45 in the folded position. With reference to FIG. 7, the barrel 110 may include an outer surface 116 adjacent the outer end of the step surface 112 that may be curved and convex. The step surface 112 may extend from the outer surface 116 inward toward the center of the hinge 84 to a recessed surface 115. The recessed surface 115 may be closer to the center of the hinge 84 than the outer surface 116 as a result of the stepped surface 112. The stop block 114 may include a mating surface 118 that may match the outer surface 116 and may ride thereon as the barrel 110 rotates. The mating surface 118 may be curved and concave. A spring 120 may be disposed between the lower component 59 and the stop block 114 biasing the surface 118 against the outer surface 116.

Figure 8:
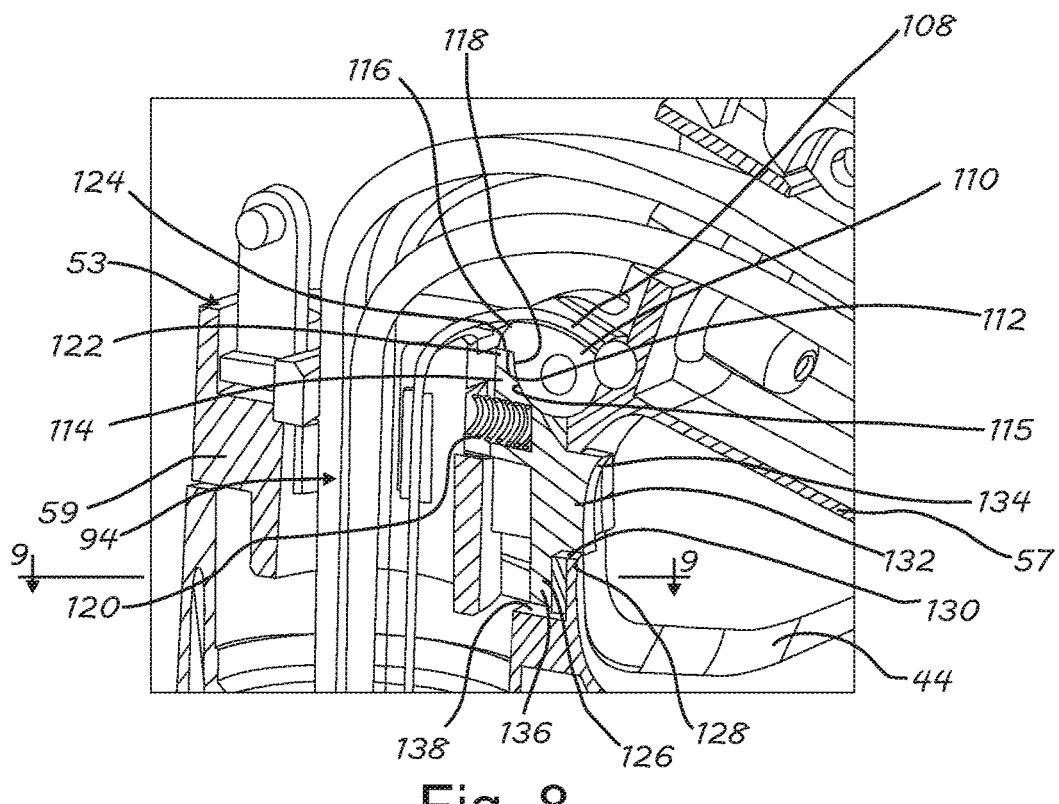
FIG. 8 illustrates aspects of the steering tube folding system of FIG. 2 in a snapshot fragmentary view according to a number of variations.

With reference to FIG. 8, in a number of variations the stop block 114 may include an end 122 forming a lock surface 124. The lock surface 124 may extend on a line radiating from the center of the hinge 84, and may extend away from the center, beginning at the mating surface 118. With the upper component 57 in the folded position of FIG. 8, the spring 120 may force the stop block 114 against the barrel 110 at the recessed surface 115 so that the end 122 moves into the step and the lock surface 124 engages against the step surface 112, locking the joint 53 in the folded position. The stop block 114 may be formed or connected with an arm 126 that may extend downward into the lower component 59 along the wall 128 thereof. An opening 130 may be formed in the wall 128 adjacent the arm 126. The arm 126 may include an extension 132 that may extend through the opening 130 and outward therefrom to provide a push button 134. The push button 134 may be depressed to move the stop block 114 to compress the spring 120 moving the lock surface 124 to disengage from the step surface 112 so that the upper component 57 may be unfolded.

Figure 9:
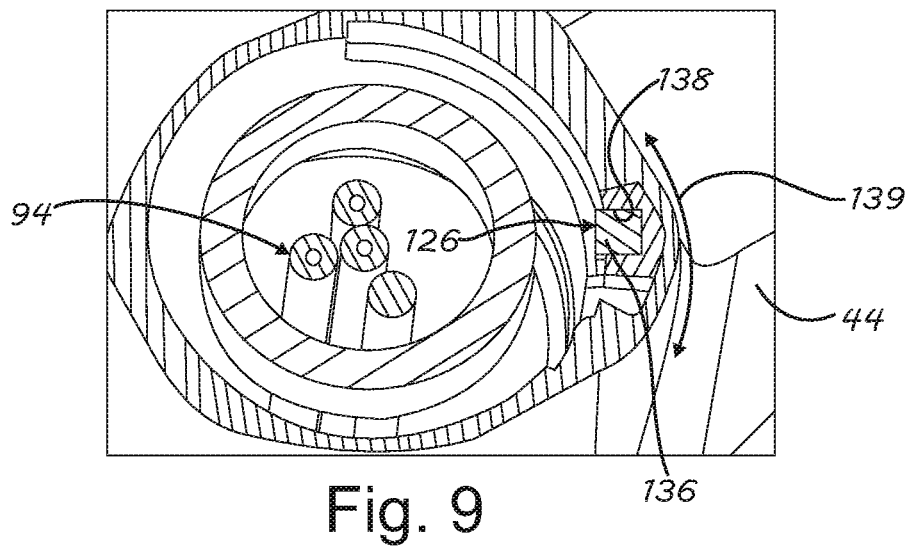
FIG. 9 illustrates a detail of the steering tube folding system taken along the line 9-9 indicated in FIG. 8 according to a number of variations.

In a number of variations the arm 126 of the stop block 114 may include a lower portion 136 that may be received in a receptacle 138 when the upper component 57 is in the folded position. The receptacle 138 may be provided in the main tube 44 or another portion of the frame 42 that does not rotate with the steering tube 45. As shown in FIG. 9, when the lower portion 136 of the arm 126 is received within the receptacle 138, the steering tube 45 is locked against rotation in the angular direction 139. When the push button 134 is depressed and the upper component 57 is unfolded, the interaction between the outer surface 116 of the barrel 110 and the mating surface 118 holds the lower portion 136 out of the receptacle 138 so that the steering tube 45 can rotate uninhibited. The set steering angle at which the steering tube 45 is locked when folded, may enable convenient transportation, including dollying. In this regard, engagement of the lower portion 136 in the receptacle 138 may be effected when the steering tube 45 is rotated approximately twenty-five degrees away from straight ahead. This may allow the handlebars to extend down below the height of the main tube 44. Gravity may hold the steering tube 45 in the folded position until the lower portion 136 is turned to register with the receptacle 138. Upon registry, and with the steering tube 45 folded, the spring 120 may automatically move the lower portion 136 into the receptacle 138, and the lock surface 124 against the stepped surface 112 to both lock the steering tube 45 in the folded position, and from rotating. Locking the steering tube 45 from rotating may facilitate carrying the cycle 40 when folded, without turning of the front wheel 54. Locking the steering tube 45 at twenty-five degrees may align the axles of the wheel 54 and the wheel 82 for straight tracking to facilitate dollying.

Figure 10:
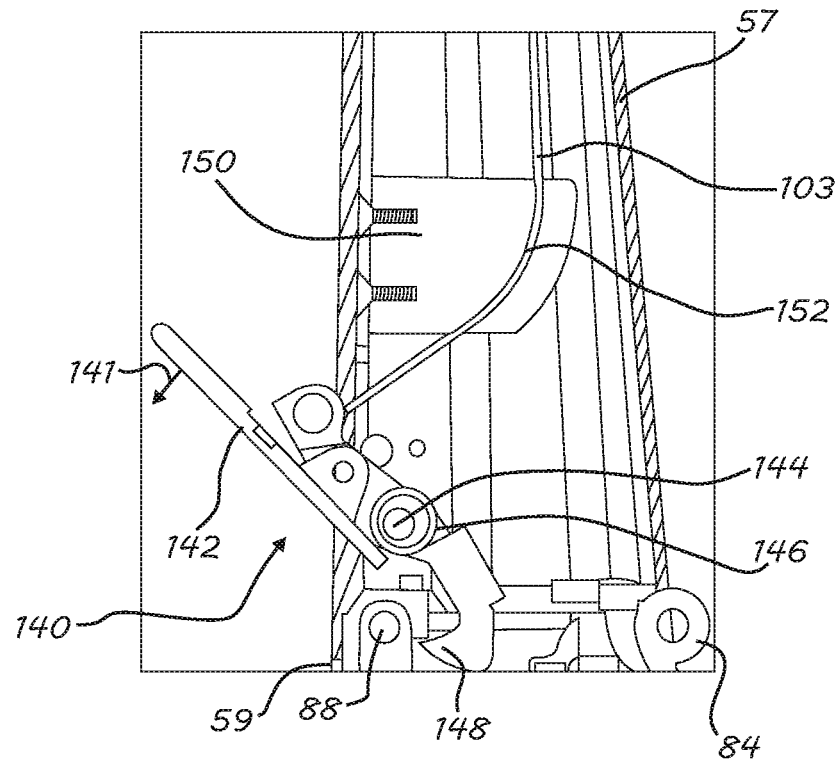
FIG. 10 illustrates a steering tube folding system area of a cycle in a snapshot fragmentary view according to a number of variations.

In a number of variations as illustrated in FIG. 10, the upper component 57 and the lower component 59 may be latched through a latch system 140. The latch system 140 may be a pull-type system where it is released through the application of a pull force 141. The latch system 140 may include a lever 142 that may rotate about a pivot 144 that may be located on the upper component 57. A spring 146 may bias the lever 142 toward a latched condition to provide automatic latching when the latch hook 148 engages the striker 88. Application of the pull force 141 to the lever 142 releases the striker 88 from the latch hook 148 so that the upper component 57 may rotate on the hinge 84 to a folded position. The cable 103 may be connected with the lever 142 above the pivot 144 so that the pull force 141 also pulls the cable 103, which may be used as an actuation mechanism in folding the handlebar assembly 48. The cable 103 may be routed on a guide 150 with a curved groove 152 that supports the cable 103 through a curve between running through the upper component 57 and the connection with the lever 142. The latch system 140 may be contained within the steering tube 45 with the lever 142 matching the outer contour thereof.

Through the variations described above, a fast and simple to operate, folding system for a cycle steering tube may be provided. The latch system 86, 140 may be compact, concealed inside frame, and may include a self-latching mechanism. Cables 94 used in operation of the cycle 40, such as brake, shifter, electrical cables or tubes, may pass through the joint internally. Concomitant, remote control, such as for locking/unlocking of other folding systems on the cycle 40 may be effected with operation of the latch system 86, 140. When released and unfolded, the steering tube 45 may self-latch in an unfolded position for steering the cycle 40.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may involve a product that may include a steering tube that may have a first component, and a second component. A hinge may be connected to enable the first and second components to fold relative to one another so that the steering tube is foldable. A latch may secure the first and second components in an unfolded position. The latch may include a lever that may have a latch hook. The product may include a striker. The first and second components may be secured through engagement of the latch hook with the striker.

Variation 2 may include the product according to variation 1 and may include a joint between the first and second components at the hinge. The first and second components may be separable at the joint through operation of the hinge. A cable bundle may extending through an inside of the first and second components and may extend through the joint.

Variation 3 may include the product according to variation 1 wherein the first and second components may be foldable to a folded position. A lock block may be engaged with the hinge to lock the first and second components in the folded position.

Variation 4 may include the product according to variation 3 and may include a frame with the steering tune rotatably connected with the frame. The lock block may include an arm engageable relative to the frame to lock the steering tube against rotation when in the folded position.

Variation 5 may include the product according to variation 3 wherein the hinge may include a barrel with a step surface that may be stepped relative to the barrel. The lock block may include an end with a lock surface. The lock surface may engage against the step surface to lock the first and second components in the folded position.

Variation 6 may include the product according to variation 5 wherein the barrel may include an outer surface adjacent the step surface. A recessed surface may be provided on an opposite side of the stepped surface from the outer surface, which may form a receptacle to receive the end of the lock block against the stepped surface.

Variation 7 may include the product according to variation 1 and may include a frame with the steering tube rotatably connected to the frame. A frame joint may be releasable to fold the frame. A cable may be connected to the frame joint and the first component.

Variation 8 may include the product according to variation 1 and may include a handlebar assembly that may be connected to the steering tube. An arm may extend from the lever. A cable may be connected to the arm and the handlebar assembly.

Variation 9 may include the product according to variation 1 wherein the steering tube may include an outer wall with an opening and the lever may be disposed in the opening.

Variation 10 may involve a product that may include a frame. A steering tube may be connected to the frame. A wheel may be connected with the steering tube. The steering tube and the wheel may be rotatable relative to the frame. A hinge may be connected to enable folding the steering tube relative to the frame between a folded position and an unfolded position. The folded position may be closer to the frame than the unfolded position. A latch may secure the steering tube in the unfolded position. The latch may include a lever that has a latch hook. The product may include a striker. The steering tube may be secured in the unfolded position through engagement of the latch hook with the striker.

Variation 11 may include the product according to variation 10 wherein a lock block may be engaged with the hinge to lock the steering tube in the folded position.

Variation 12 may include the product according to variation 11 wherein the lock block may include an arm engageable relative to the frame to lock the steering tube against rotation when in the folded position.

Variation 13 may include the product according to variation 11 wherein the hinge may include a barrel with a step surface that may be stepped relative to the barrel. The lock block may include an end with a lock surface. The lock surface may engage against the step surface to lock the first and second components in the folded position.

Variation 14 may include the product according to variation 13 wherein the barrel may include an outer surface adjacent the step surface. A recessed surface may be provided on an opposite side of the stepped surface from the outer surface, which may form a receptacle to receive the end of the lock block against the stepped surface.

Variation 15 may include the product according to variation 10 and may include a frame joint that may be releasable to fold the frame. A cable may be connected to the frame joint and the first component.

Variation 16 may include the product according to variation 10 and may include a handlebar assembly that may be connected to the steering tube. An arm may extend from the lever. A cable may be connected to the arm and the handlebar assembly.

Variation 17 may include the product according to variation 10 and may include a joint at the hinge. The first steering tube may be separable at the joint through operation of the hinge. A cable bundle may extending through an inside of the steering tube and may extend through the joint.

Variation 18 may include the product according to variation 10 wherein the steering tube may include an outer wall with an opening and the lever may be disposed in the opening.

Variation 19 may include the product according to variation 10 and may include a lock block to lock the steering tube in the folded position. The hinge may include a barrel rotatable relative to the lock block and may include a step. A spring may force the lock block against the barrel and may move the lock block into the step when the steering tube is in the folded position.

Variation 20 may include the product according to variation 19 wherein the frame may include a receptacle. The lock block may be engageable in the receptacle when the steering tube is in the folded position to lock the steering tube from rotating.

The above description of select variations within the scope of the invention is merely illustrative in nature and, thus, variations or variants thereof are not to be regarded as a departure from the spirit and scope of the invention.

What is claimed is:

1. A product comprising a tube that has a first component and a second component, a hinge enabling the first and second components to fold relative to one another so that the tube is foldable, wherein the tube includes an outer wall with an opening and the lever is disposed in the opening, a latch securing the first and second components in an unfolded position, the latch including a lever with a latch hook, and comprising a striker, the first and second components secured through engagement of the latch hook with the striker.

2. The product according to claim 1 comprising a joint between the first and second components at the hinge, the first and second components separable at the joint through operation of the hinge, with a cable bundle extending through an inside of the first and second components and extending through the joint.

3. The product according to claim 1 wherein the first and second components are foldable to a folded position and comprising a lock block engaging with the hinge to lock the first and second components in the folded position.

4. The product according to claim 3 comprising a frame with the tube rotatably connected with the frame, wherein the lock block includes an arm engageable relative to the frame to lock the tube against rotation when in the folded position.

5. The product according to claim 3 comprising a barrel with a step surface that is stepped relative to the barrel, wherein the lock block includes an end with a lock surface, the lock surface engaging against the step surface to lock the first and second components in the folded position.

6. The product according to claim 5 wherein the barrel includes an outer surface adjacent the step surface and a recessed surface on an opposite side of the stepped surface from the outer surface, forming a receptacle to receive the end of the lock block against the stepped surface.

7. The product according to claim 1 comprising a handlebar assembly connected to the tube wherein an arm extends from the lever, and a cable is connected to the arm and the handlebar assembly.

8. A product comprising a tube that has a first component and a second component, a hinge enabling the first and second components to fold relative to one another so that the tube is foldable, a latch securing the first and second components in an unfolded position, the latch including a lever with a latch hook, a striker, the first and second components secured through engagement of the latch hook with the striker, a frame with the tube rotatably connected to the frame, a frame joint releasable to fold the frame, and a cable connected to the frame joint and the first component.

9. A product comprising a frame, a steering tube connected to the frame, a wheel connected with the steering tube, the steering tube and the wheel rotatable relative to the frame, a hinge connected to enable folding the steering tube relative to the frame between a folded position and an unfolded position, the folded position closer to the frame than the unfolded position, a latch securing the steering tube in the unfolded position, the latch including a lever with a latch hook, a lock block engaging with the hinge to lock the steering tube in the folded position, and comprising a striker, the steering tube secured in the unfolded position through engagement of the latch hook with the striker.

10. The product according to claim 9 wherein the lock block includes an arm engageable relative to the frame to lock the steering tube against rotation when in the folded position.

11. The product according to claim 9 wherein the hinge includes a barrel with a step surface that is stepped relative to the barrel, and the lock block includes an end with a lock surface, the lock surface engaging against the step surface to lock the first and second components in the folded position.

12. The product according to claim 11 wherein the barrel includes an outer surface adjacent the step surface and a recessed surface on an opposite side of the stepped surface from the outer surface, forming a receptacle to receive the end of the lock block against the stepped surface.

13. The product according to claim 9 comprising a frame joint releasable to fold the frame, and a cable connected to the frame joint and the first component for concomitant folding of the frame and the steering tube.

14. The product according to claim 9 comprising a handlebar assembly connected to the steering tube wherein an arm extends from the lever, and a cable is connected to the arm and the handlebar assembly for concomitant folding of the steering tube and the handlebar assembly.

15. The product according to claim 9 wherein the steering tube is separable at the joint through operation of the hinge, with a cable bundle extending through an inside of the steering tube and extending through the joint.

16. The product according to claim 9 wherein the steering tube includes an outer wall with an opening, and the lever is disposed in the opening.

17. The product according to claim 9 comprising a lock block to lock the steering tube in the folded position, wherein the hinge includes a barrel rotatable relative to the lock block and including a step, a spring forcing the lock block against the barrel and moving the lock block into the step when the steering tube is in the folded position.

18. The product according to claim 17 wherein the frame includes a receptacle and the lock block is engageable in the receptacle when the steering tube is in the folded position to lock the steering tube from rotating.

* * * * *